July 24, 1956 — R. C. SWENGEL — 2,755,662
ULTRASONIC ABSORPTION MEASURING APPARATUS
Filed May 1, 1953 — 3 Sheets-Sheet 1

*INVENTOR.*
ROBERT C. SWENGEL
BY
ATTORNEY.

July 24, 1956     R. C. SWENGEL     2,755,662
ULTRASONIC ABSORPTION MEASURING APPARATUS
Filed May 1, 1953     3 Sheets-Sheet 3
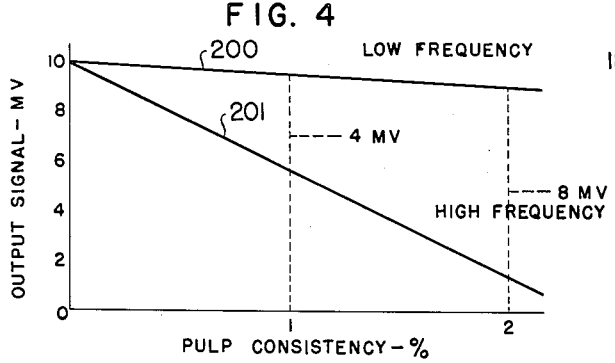
FIG. 4
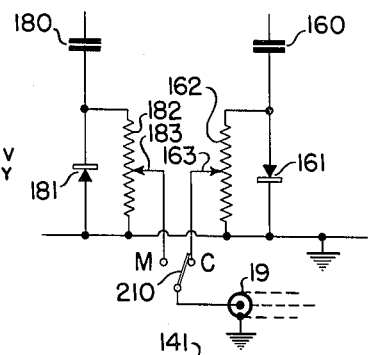
FIG. 6
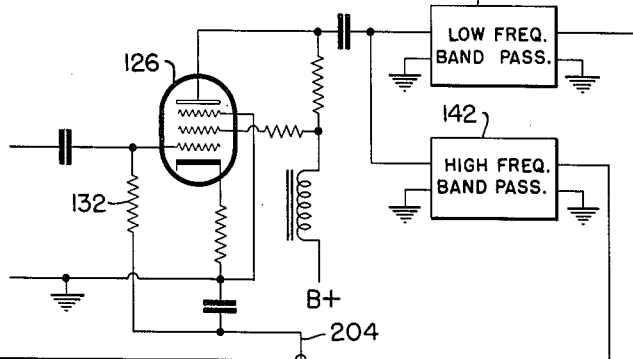
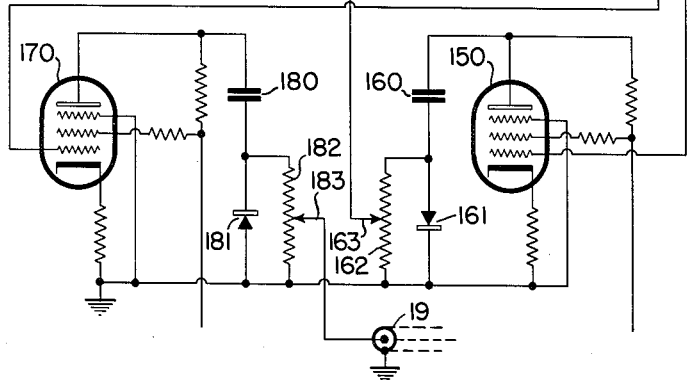
FIG. 5
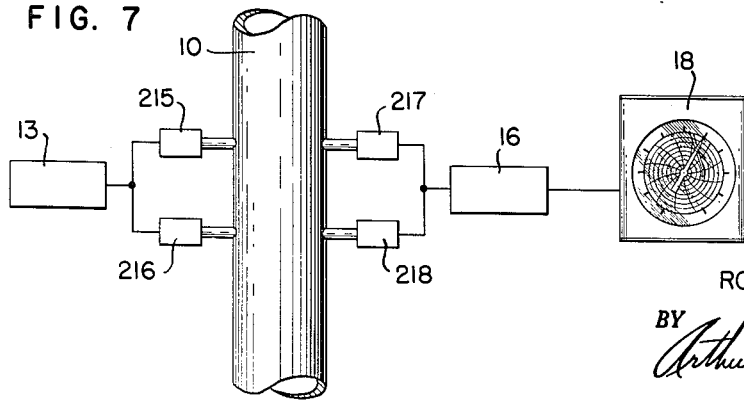
FIG. 7
*INVENTOR.*
ROBERT C. SWENGEL
BY Arthur H. Swanson
ATTORNEY.

United States Patent Office 2,755,662
Patented July 24, 1956

2,755,662

ULTRASONIC ABSORPTION MEASURING APPARATUS

Robert C. Swengel, York, Pa., assignor to Minneapolis-Honeywell Regulator Company, Minneapolis, Minn., a corporation of Delaware Application May 1, 1953, Serial No. 352,509

15 Claims. (Cl. 73—67)

A general object of the present invention is to provide an improved measuring apparatus which is operative to measure a characteristic of a medium under examination, and particularly, a measuring apparatus which depends for its operation upon the principle of determining the attenuation of wave energy transmitted through the medium.

The improvement of many product producing processes depends upon having accurate information concerning the quality or condition of materials or solutions which make up the final product. For accurate process control it is desirable that the materials or solutions be maintained under continuous observation as they flow or move through the process. This entails many difficulties in that observations made should not interfere with the final product or with the material as it flows in the process. Attempts to overcome these difficulties have been made by prior workers in the field. Thus, it is known in the art that investigations of certain materials may be conducted by measuring the attenuation of mechanical vibrations transmitted through the materials.

As the points in a process at which the observations must be made are determined by the process itself and cannot arbitrarily be selected, it frequently is impossible to make the desired observations except under difficult conditions which have limited the usefulness of the known prior arrangements. For example, the space available for making the measurements often is restricted. Thus, in a process flow line, mechanical vibrations tend to be reflected from the sides of the line adversely to affect the observation made. Further, ambient temperature and pressure conditions may not be uniform and may adversely affect the operation of the mechanical vibration transmitter and receiver. There may also be some drifting tendencies due to the aging of the transmitters and receivers, another factor tending to influence the accuracy of the observation.

An important object of the present invention is to eliminate or at least minimize these afore-mentioned difficulties and deficiencies in apparatus for measuring a characteristic of a material by means of mechanical vibrations transmitted therethrough.

In making measurements of a characteristic of a material by determining the attenuating effect of the material on the applied mechanical vibrations, it has been discovered that the attenuation of the vibrations is dependent upon the frequency of the vibrations as well as the material. Thus, in measuring the consistency of paper pulp, it has been found that a low frequency ultrasonic signal will pass through the paper pulp mixture with very little attenuation while a high frequency ultrasonic signal will be attenuated appreciably. The present invention utilizes this difference in the attenuating effect of the solution on vibrations of high and low frequencies by employing the low frequency signal to establish a standard or base with which the high frequency attenuation may be compared. In this manner, there is effected compensation for unpredictable drift and ambient condition variations which would otherwise affect the indicated pulp consistency. Further, it has been found best to employ a multi-frequency source to establish a single signal source for the low and high frequencies to the end of eliminating the standing wave effects of mechanical vibrations tending to be established in the space wherein the material observation is being made. Thus, in the measurement of paper pulp consistency, the measurements may be conducted on a cross section of flow pipe which may be approximately four to eight inches in diameter. Pipes of this size are extremely susceptible to having mechanical vibrations reflect back and forth across the pipe, which tend to build up and maintain standing wave conditions which can destroy any semblance of measurement accuracy.

It is, therefore, a further object of the present invention to provide a new and improved measuring apparatus wherein a measurement of a material condition is made by transmitting through the material a wide range of frequencies where the frequencies at one range are used to establish a reference with respect to the frequencies of another range.

Another object of the present invention is to provide an ultrasonic measuring apparatus utilizing a so-called noise source where the output of the apparatus is derived from the relationship between two frequencies displaced from each other in the frequency spectrum of the noise source.

Still another object of the present invention is to provide an ultrasonic measuring apparatus wherein mechanical vibrations are transmitted through a material under observation and the frequency of the vibrations are statistically random in nature with one frequency band being used to establish a circuit regulating characteristic so that a further frequency band may be used to establish a signal which is indicative of the magnitude of a condition of the material under examination.

A still further object of the present invention is to provide an ultrasonic absorption type meter which may be quickly and accurately calibrated.

Still another object of the present invention is to provide an ultrasonic absorption type meter which will be continuously maintained in a state of electrical balance to eliminate drift conditions associated with the components thereof which are independent of changes in the condition of the material under examination.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 4 shows a representative curve of the vibration attenuation of a material under examination;

Fig. 5 shows a modified circuit for the receiving apparatus;

Fig. 6 shows a further modification of the output of the receiver apparatus used in calibration; and Fig. 7 shows modified arrangements of the transmitting and receiving transducers of the apparatus.

Figure 1:
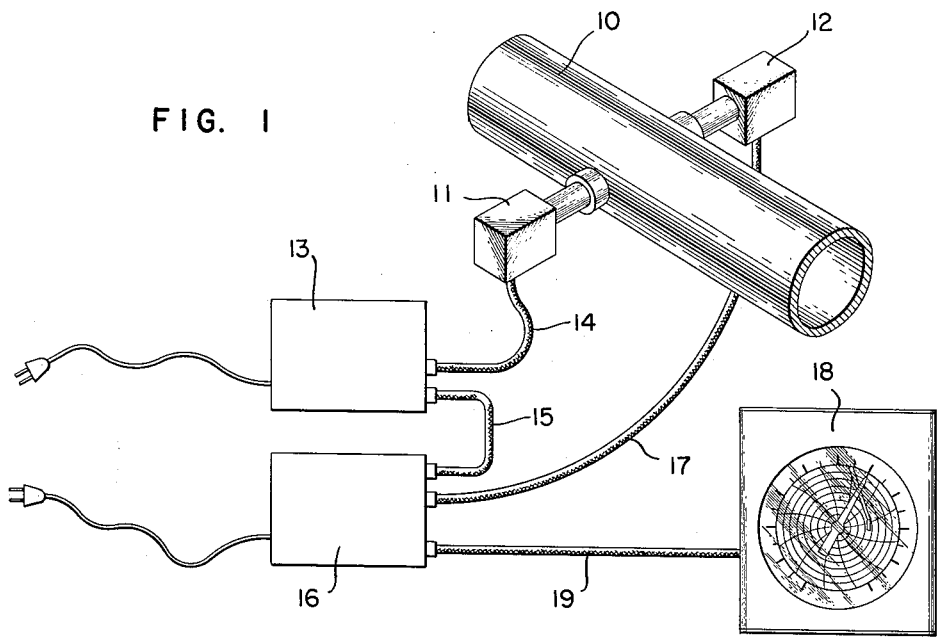
Fig. 1 is a digrammatic illustration of the arrangement of the components of the apparatus in accordance with the present invention.

Referring now to Fig. 1, the numeral 10 represents a pipe or conduit through which is flowing a material whose condition is to be measured, which by way of example, may be a paper pulp solution. For purposes of illustration, it may be assumed that the material flowing through the pipe 10 is a paper pulp solution whose consistency is to be determined by the present apparatus. Positioned on the left side of the pipe 10 is a transmitting transducer 11 of the ultrasonic type. Positioned on the opposite side of the pipe 10 is a further transducer 12 which acts as the receiving transducer of the apparatus. For supplying electrical driving energy for the transducer 11 there is provided an ultrasonic signal generator 13. One form of this ultrasonic signal source comprises a noise source wherein there is a wide range of statistically random frequencies of substantially constant amplitude produced. The output of the source 13 is coupled to the transmitting transducer 11 by way of a cable 14. A further cable 15 is used to connect the source 13 to a receiving amplifier and filter section 16 which also has an input from the receiving transducer 12 by way of cable 17. The output of the receiver and filter section 16 is by way of the cable 19 and this is connected to a suitable indicating and recording apparatus 18. Apparatus 18 is an indicating and recording apparatus, preferably of the form disclosed in the patent of Walter P. Wills, 2,423,540, issued July 8, 1947. This apparatus is adapted to indicate and record the magnitude of an electrical signal applied to its input terminals.

In the operation of the apparatus arrangement of Fig. 1, the output signal from the ultrasonic signal source 13 is transmitted through the cable 14 to the transducer 11 which serves to convert the output signals to mechanical vibrations which are transmitted through the solution flowing through the pipe 10. The mechanical vibrations are received by the receiving transducer 12 and are converted into an electrical signal which is fed through the cable 17 to the receiving and filtering section 16. The output of the receiving and filtering section 16 is an electrical signal which will be applied to the indicating apparatus 18 through the cable 19.

Figure 2:
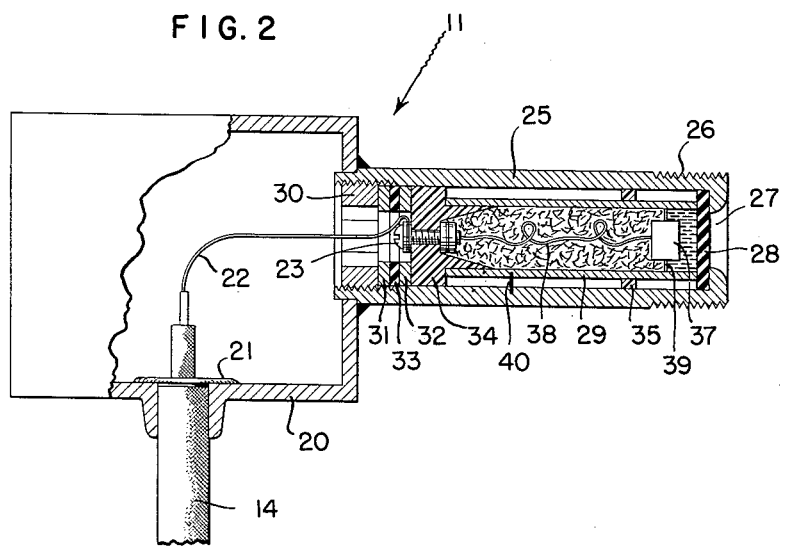
Fig. 2 shows one form that the transmitting and receiving electro-mechanical transducers may assume.

Fig. 2 shows a preferred form of the electro-mechanical transducers of the present apparatus. As the transmitting and receiving transducers are substantially the same, a detailed description of the transmitting transducer 11 only will be made. As shown, the cable 14 is physically attached to the housing 20 with the shielding 21 of the cable 14 electrically connected to the housing 20. The center conductor 22 of the cable 14 is arranged for connection to an electrical terminal 23. Supporting the housing 20 is a cylindrical member 25 which is threaded at 26 so as to be readily engageable with the pipe 10. The outer end of the member 25 has an opening 27 which is sealed by a silicone rubber diaphragm 28. The diaphragm 28 is held in position by a further cylindrical member 29 which is forced into engagement with the diaphragm by a threaded member 30 which engages threading on the inner surface of the cylinder 25. The threaded member 30 acts through a pair of washers 31 and 32 and a sealing rubber washer 33 with the washer 32 bearing against a polystyrene bushing 34. The bushing 34 serves as the mounting point for the electrical terminal 23. The cylindrical member 29 is maintained in position at its outer end by means of a suitable plastic spacer 35 which may be in peripheral engagement with the outer surface of the cylinder 29.

Mounted within the cylinder 29 is an electro-mechanical transducer element 37. This transducer element may take the form of any of the well-known transducers presently commercially available. A transducer material which is presently very widely used is barium titanate which is capable of producing large mechanical vibrations with relatively small electrical signals. Such a transducer is disclosed in the Gray patent, 2,486,560, issued November 1, 1949. The electrical contact is made with the transducers by way of the connecting wire 38 and a further wire 39 which connects to a housing 20 by way of the cylinder 29, connector 40, and the cylinder 25. The space in back of the transducer element 37 is filled with a mixture of castor oil and rock wool which has the effect of damping out the mechanical vibrations which move in the reverse direction from the transducer 37. The space in front of the transducer 37 is filled with castor oil alone which serves to mechanically couple the transducer vibrations through the diaphragm 28 to the space adjacent to the outer edge of the diaphragm 28.

The electrical signals received from the cable 14 are applied to the transducer 37 and the transducer will produce mechanical vibrations which will follow the electrical signals on the input. These vibrations are transmitted through the diaphragm 28 to the material outside of the diaphragm and in contact therewith.

When the apparatus of Fig. 2 is used as a receiver, the mechanical vibrations are transmitted in through the opening 27, through the diaphragm 28 to the transducer 37 where the mechanical vibrations are converted to electrical signals. The electrical signals are then transmitted through the cabling to the appropriate electrical circuit.

Figure 3:
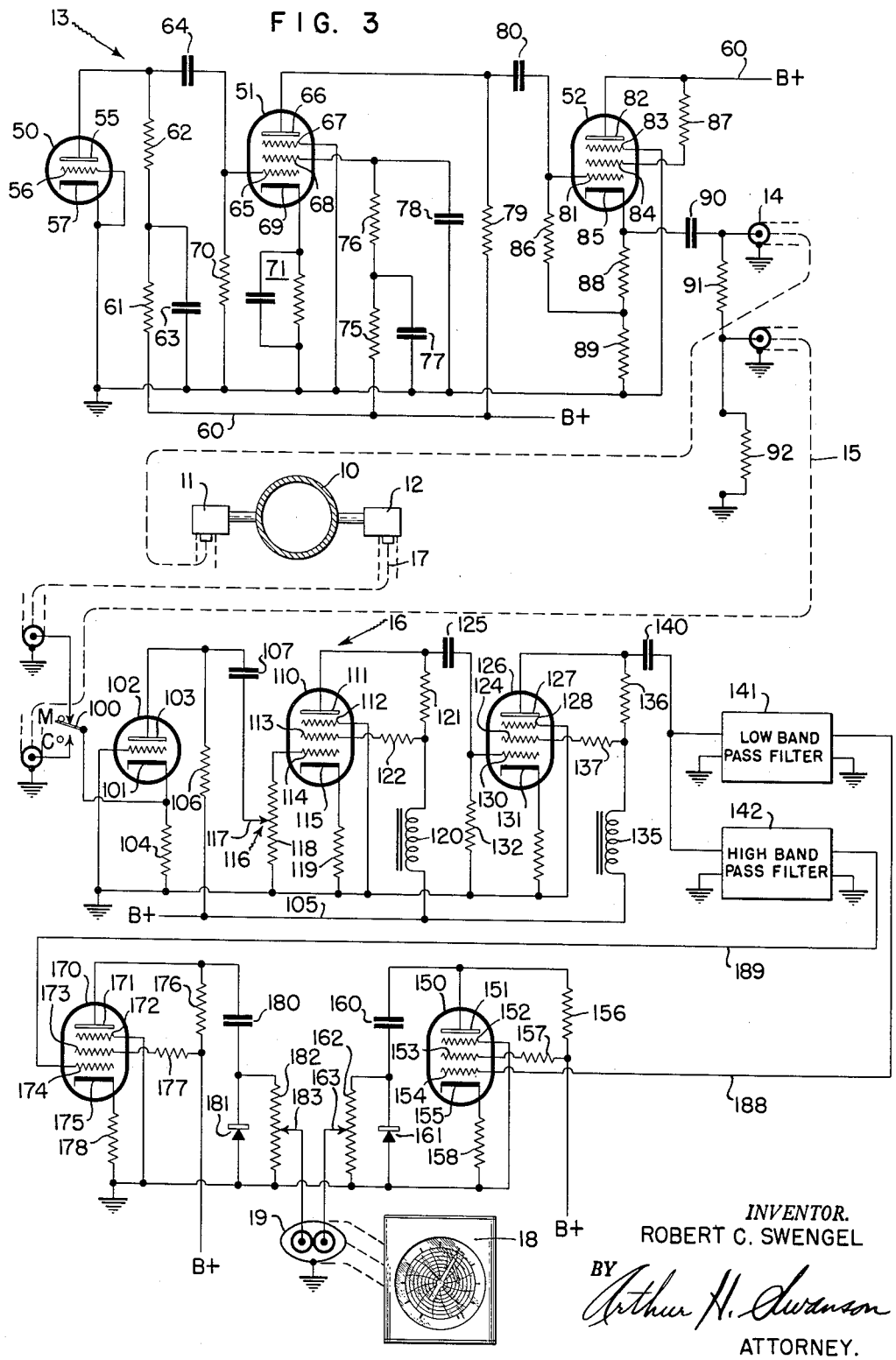
Fig. 3 shows one form of the electrical circuit and its associated elements as they may be used in the apparatus shown in Fig. 1.

The electrical circuit of Fig. 3 is a detailed showing of the electrical circuitry that may be used in the configuration shown in Fig. 1. In order to facilitate the consideration of the two figures, corresponding reference numerals have been shown in both figures for corresponding components. The electrical signal source for the ultrasonic signals used in the transmitting transducer 11 is shown in the upper half of the drawing of Fig. 3 and may be seen to comprise the following principle components: a noise generator 50 which takes the form of a gaseous triode connected as a diode; an amplifying device 51 in the form of a pentode; and an amplifier impedance matching device 52, also in the form of a pentode. The noise generator 50 will be seen to comprise an anode 55, a control electrode 56, and a cathode 57, the latter of which is directly connected to the control electrode 56. This noise generator is characterized by its ability to produce a wide range of statistical random frequencies which are of substantially constant magnitude with the frequency range extending from a few kilocycles to several megacycles. The electrical power for this noise generator 50 is supplied by way of a high voltage power bus 60, a filter resistor 61, and a plate resistor 62. The filter resistor 61 cooperates with a filter condenser 63 in a normal manner to eliminate fluctuations in the power supply, not shown.

The output of the noise generator 50 is passed through a coupling condenser 64 to the input control electrode 65 of the amplifier device 51. This device 51 also includes an anode 66, a suppressor electrode 67, a screen electrode 68, and a cathode 69. A conventional grid resistor 70 is connected between the control electrode 65 and a ground terminal while the cathode 69 has a conventional cathode biasing circuit 71 connected therebetween and ground. A voltage is supplied from the high voltage bus 60 to the screen electrode by way of a filter resistor 75 and a screen resistor 76. A condenser 77 cooperates with the filter resistor 75 in the normal manner. A condenser 78 acts as a screen by-pass condenser for the screen electrode 68. The anode voltage for the anode 66 of device 51 is supplied by way of a plate resistor 79.

The output of the device 51 is passed through a conventional coupling condenser 80 to the input control electrode 81 of the device 52. This device will be seen to comprise an anode 82, a suppressor electrode 83, a screen electrode 84, and a cathode 85. Connected to the control electrode 81 is the conventional grid resistor 86 while connected to the screen electrode 84 is a screen voltage dropping resistor 87. A pair of output resistors 88 and 89 are connected between the cathode 85 and ground with the upper terminal of the resistor 88 serving as the output terminal for the apparatus. This particular stage serves as an impedance reducing stage so that the output of the apparatus will be matched to the characteristic impedance of the cable 14. A coupling condenser 90 is connected between the cathode 85 and the input to the cable 14. A further resistor 91 and a resistor 92 act as a voltage divider with the junction thereof being connected to the cable 15. This voltage divider provides the means for reducing the output signal applied to the cable 15 as will be understood upon considering the operation of the apparatus explained below.

The electrical signal on the cable 14 is transmitted to the transducer 11 where it is converted to mechanical vibrations and transmitted through the pipe 10 to the receiving transducer 12. The receiving transducer 12 will preferably contain some impedance matching circuits for matching the output of the transducer therein to the cable 17 and this may take the form of a conventional cathode follower circuit, not shown. The cable 17 is coupled to the input of the receiving and filtering apparatus 16. The cable 17 comes into the apparatus 16 by way of a measure-calibration switch 100 which when in the upper position connects the output of the cable 17 to the input of the apparatus and when in the lower position connects the output of the calibration cable 15 into the input of the apparatus 16. The switch 100 is connected to the cathode 101 of a grounded grid triode 102. The triode 102 comprises an anode 103, as well as the cathode 101. The cathode 101 is connected to ground by way of a resistor 104 and the high voltage for the anode 103 is supplied by a high voltage bus 105 by way of a plate resistor 106.

The output of the device 102 is coupled by way of a coupling condenser 107 to the input of a pentode amplifier section 110. This pentode comprises an anode 111, a suppressor electrode 112, a screen electrode 113, a control electrode 114, and a cathode 115. The control electrode 114 is connected to the coupling condenser 107 by way of a gain control potentiometer 116 comprising a slider 117 movable over an associated resistor 118. A cathode resistor 119 is connected between the cathode 115 and ground. The high voltage for the anode 111 is supplied by way of a high frequency choke coil 120 and a resistor 121. A resistor 122 is connected to the screen electrode to supply high voltage thereto from the anode supply connection. The electrical components of this stage are selected to transmit and amplify a wide band of frequencies with minimum of attenuation.

The output of the amplifier device 110 is coupled by way of a coupling condenser 125 to the input of a further amplifier device 126 which amplifier device and its circuits is substantially the same as the device 110 and its circuits. Here the device 126 comprises an anode 127, a suppressor electrode 128, a screen electrode 124, a control electrode 130, and a cathode 131. A conventional grid resistor 132 is connected between the control electrode and ground and the anode is supplied by a high voltage by way of a high frequency choke coil 135 and a plate resistor 136. A screen resistor 137 serves to supply high voltage to the screen electrode 124 by way of the choke coil 135.

The output of the device 126 is coupled by way of a coupling condenser 140 to the input of a pair of band pass filters. These band pass filters include a low pass filter 141 and a high band pass filter 142.

The output of the low band pass filter 141 is fed to a further amplifier device 150 which comprises an anode 151, a suppressor electrode 152, a screen electrode 153, a control electrode 154, and a cathode 155. The anode receives its energizing high voltage from a suitable high voltage source by way of the plate resistor 156 while the screen electrode is likewise connected to the high voltage source by way of the screen resistor 157. The cathode 155 is connected to ground by way of a cathode resistor 158. The output signal from the anode 151 of the device 150 is passed through a coupling condenser 160 to a suitable rectifier 161 and an output resistor in the form of a potentiometer 162. The resistor 162 has an adjustable slider 163.

The output of the high band pass filter 142 is connected to the input of a further amplifier device 170. This device comprises an anode 171, a suppressor electrode 172, a screen electrode 173, a control electrode 174, and a cathode 175. The anode 171 is arranged for connection to a suitable high voltage source by way of a plate resistor 176 while a resistor 177 serves as the connecting means for the screen electrode 173 to a suitable high voltage source. A cathode resistor 178 is connected between the cathode 175 and ground. The output signal from the anode 171 is fed through a coupling condenser 180 to a suitable rectifier 181 as well as an output resistor 182 having an adjustable slider 183. The signals on the sliders 163 and 183 are coupled to the cable 19 which will feed the electrical signals to the indicating instrument 18.

In considering the operation of the apparatus shown in Fig. 3, it is assumed that power is supplied to the apparatus so that there is high voltage present for the amplifying tubes and that for all of the cathodes requiring heating there is provided a suitable heating means and power source, not shown. With power being supplied to the source 13, the noise generator or multi-frequency source 50 will produce a wide band of statistically random frequencies whose envelope will be of substantially constant magnitude. As mentioned above, this frequency range may extend from a few kilocycles to several megacycles. The output signal from the generator 50 is passed through the coupling condenser 64 to the amplifying device 51 and from there to the further amplifying device 52 which is arranged as a cathode follower circuit of conventional type for matching the output impedance of the device 52 to the characteristic impedance of the cable 14. By properly matching the output of the device 52 to the input of the cable 14 there will be a maximum transmission of the electrical signal with a minimum of power loss and reflection in the cable. This electrical signal is applied to the transducer 11 which will convert the signal into mechanical vibrations which will have frequencies corresponding to the frequencies of the electrical signal generated by the noise generator 50. Inasmuch as there are a wide range of frequencies being applied to the solution within the pipe 10, these frequencies will tend to cancel each other and to prevent the formation of a standing wave condition which will disrupt the normal measuring operation. While an apparatus of this type may be made to operate with a single frequency being passed through the solution, a successful operation of such an apparatus depends upon all of the ambient conditions of temperature, pressure, and the like remaining constant as well as the positioning of the elements remaining constant. Any change in these ambient conditions will create a standing wave condition which will upset a single frequency type apparatus. For this reason, the noise source is used in order to eliminate any effects from reflected vibrations present within the pipe.

The mechanical vibrations from the transducer 11 which are transmitted through the pipe 10 are received by the transducer 12. The magnitudes of the received signals from the transducer 12 will be dependent upon the absorption or attenuation of the signal originating from the transducer 11. This will be seen when considering Fig. 4 where there is shown a plot of the output signal transmitted through the mixture with the variations resulting from different frequencies. This plot shows the signal attenuation variation for two representative frequencies for variations in the consistency of a paper pulp mixture. Assuming that the mixture of the paper pulp has a consistency of one per cent, it will be noted from the curve 200 that the low frequency signal has an output signal magnitude of approximately 9.5 millivolts while the output signal from the high frequency will have a magnitude of approximately 5.5 millivolts. This indicates that the low frequency signal is going through the mixture with very little attenuation while the high frequency signal is going through with a relatively high attenuation.

The signals received by the receiving transducer 12 will be passed through the cable 17 to the input of the grounded grid amplifier tube 102. The signal is then passed from the output of the device 102 through the coupling condenser 107 to the input of the device 110 and from there to the input of the amplifying device 126 through the coupling condenser 125. The output of the device 126 is passed through the coupling condenser 140 to the input of the low band pass filter 141 and the high band pass filter 142 where the low frequency and the high frequency components are separated into distinct separate bands with their amplitudes identified by the lines 200 and 201 in Fig. 4. The output of the low band pass filter 141 is passed by way of the conductor 188 to the output amplifying device 150. This low frequency signal will be amplified by the device 150 and applied to coupling condenser 160 to the rectifier 161 where there will be produced across the resistor 162 a direct current voltage which will be proportional to the magnitude of the signals from the amplifier device 150. An adjustable portion of the direct current voltage on resistor 162 is picked off by the slider 163 and is applied to one of the conductors on cable 19.

Similarly, the output of the high band pass filter 142 is passed through a conductor 189 to the input of the amplifying device 170. This amplifying device will produce an output signal which will be applied through the coupling condenser 180 to the rectifier 181 which rectifier will be effective to establish across the resistor 182 a direct current voltage proportional to the magnitude of the high frequency which is applied to the rectifier. The direct current here will then be picked off by the slider 183 and will be applied to the other conductor of the cable 19. The signal applied to the input of the indicator 18 will be the difference between the direct current output signal on the slider 163 and the direct current output signal on the slider 183. Thus, referring to Fig. 4, and with the pulp consistency still one per cent, it will be noted that the difference between the curve 200 and the line 201 is approximately 4 millivolts. This magnitude of voltage will produce an appropriate indication upon the instrument 18.

If the now the pulp consistency should change from one per cent to two per cent, it will be seen that the difference between the lines 200 and 201 is increased so that the difference is now approximately 8 millivolts. It will thus be seen that there will be produced on the output of the apparatus a direct output signal which is proportional to the pulp consistency. While the pulp consistency mixture has been used as a representative substance, it will be obvious that there are many mixtures or solutions which are capable of examination by the apparatus in a way corresponding to the foregoing.

Should there be a tendency for the ambient temperature of the solution in the pipe 10 to change or should there be some drift tendency in the transducers 11 and 12, such tendencies are automatically compensated for by the arrangement shown in Fig. 3. Assume, for example, that the output magnitude of the mechanical vibrations from the transducer 11 suddenly deceases due to aging of the transducer or due to some other cause such as a decrease in the output from the preceding amplifier stage. While this decrease will result in a decrease of the overall amplitude of the received low and high frequency signals, the difference in those signals will be dependent solely upon the energy absorbed by the solution in the pipe 10. Thus, if the low frequency and the high frequency signals are decreased in amplitude, their decrease will be the same for both frequencies such that the curves 200 and 201 of Fig. 4 will be shifted downwardly by an equal amount. The indicating instrument 18 will not sense this as the difference between the two signals will remain the same. Any attenuation in the receiving transducer 12 will act in the same way to shift both of the curves 200 and 201 shown in Fig. 4. It will also be seen that any signal attenuation in generator section 13 as well as the other amplifier sections ahead of the band pass filters will produce the same result as far as shifting the curves 200 and 201 by a corresponding amount, while their differences remain substantially the same. If there is drifting difficulty in the output amplifier devices 150 and 170, it is possible to add a further stage of amplification ahead of the band pass filters and connect the rectifiers directly to the outputs of the filters.

The apparatus shown in Fig. 3 is in the measuring position. If it is desired to calibrate the apparatus, the calibration switch 100 is switched from the position M to the position C. When in this position, the output signal from the generator section 13 will be passed through the cable 15 from the voltage divider comprising resistors 91 and 92 to the lower contact of the calibration switch 100 and thence to the input of the device 102. The sizes of the resistors 91 and 92 on the output of the device 13 are selected so that the amplitude of the signal applied to the input of the device 102 will correspond to the amplitude of a signal transmitted through the transducer 11, the solution in pipe 10 and transducer 12. The signal which is applied to the input of the device 102 will have substantially no attenuation over the wide band of frequencies transmitted so that the low frequency signal and the high frequency should be of the same amplitude. With the signals being of the same amplitude, they will be passed through the amplifier section including the devices 102, 110, and 126 to the filters 141 and 142 where they will be separated and applied to the respective output amplifiers 150 and 170. As their amplitudes should be the same, the output resistors 163 and 183 will be adjusted so that there is a balance on the input of the instrument 18.

While the apparatus of Fig. 3 shows one manner in which the drifting and attenuation characteristics of the components may be compensated for, there are other ways of accomplishing this. Thus, the apparatus of Fig. 5 shows one form of the apparatus where the low frequency signal is used to control the gain of the receiver amplifier. In the apparatus shown in the modification of Fig. 5 the components of the apparatus are the same as those of Fig. 3 with the electrical circuit modified so that now the output signal applied to the cable 19 is only the output signal from the high frequency band pass filter. The low frequency signal on the slider 163, instead of going to the cable 19, is now connected by way of a conductor 204 to the lower end of the resistor 132 on the input of the amplifier device 126. Further, the rectifier 161 has been reversed in its position in the circuit so that now the voltage appearing across the resistor 162 and on the slider 163 is negative with respect to ground.

The low frequency signal, being the one which has substantially no attenuation when flowing through the mixture in the pipe 10, is selected as the base or reference signal and serves to establish an amplifier gain which is dependent primarily upon circuit constant changes rather than any changes due to change in the solution within the pipe 10. Thus, if there should be a decrease in the transmitting characteristics of the transmitter transducer 11, shown in Fig. 3, there would be a resultant decrease in the overall signals transmitted through the receiver amplifier and this decrease in signal would result in the decrease in the output signal from the high frequency filter section with a resultant change in the indication of the instrument 18 connected to the cable 19. However, due to the fact that the low frequency signal is acting as an automatic gain control signal, the reduction in amplitude of the low frequency signal will result in a reduction in the negative biasing voltage applied to the control electrode 126 by way of the conductor 204 and resistor 132. This will result in an increased amplification by the amplifier section so that the high frequency signal going to the indicating instrument will not be attenuated. Should there be a change in the opposite direction, with an increased signal appearing, this increase will appear on both the high and the low frequency filter outputs and the low frequency output will produce a gain control voltage which will tend to reduce the gain of the amplifier device 26 and hold the output of the high frequency substantially constant.

The apparatus shown in Fig. 6 shows a modified way of obtaining an output signal from the apparatus. Here the electrical components correspond to the electrical components of Fig. 3, the low frequency signal being applied through the coupling condenser 160 to the rectifier 161 and the high frequency being applied through the coupling condenser 180 to the rectifier 181. The rectifier outputs are applied to their respective output resistors 162 and 182. In addition, there is provided a calibrate and measure switch 210 having an upper or calibrate position C and a lower measure position M. When the apparatus is in the M position, the output of the high frequency portion of the apparatus will be fed directly to the cable 19 and thence to the instrument 18, shown in Fig. 3. When the apparatus is switched to the calibrate position C, the low frequency signal is connected to the input of the indicating instrument 18 and when so connected the amplifier gain may be appropriately adjusted by such means as the slider 117 shown in the receiver section, Fig. 3, on the input of device 110. Thus, with a certain signal on the input of the apparatus, the low frequency signal may be used to establish the amplifier gain or output desired for that particular signal as it passes through the mixture in pipe 10. Once this particular value has been established, the apparatus may be switched to the measure position M and the normal measurement made by reading only the magnitude of the output signal from the high band pass filter. The arrangement shown in Fig. 6 is suitable for conditions where the ambient conditions associated with the mixture measurement are substantially constant. If there is a drifting of these ambient conditions, the apparatus shown in Fig. 3, or that of Fig. 5, is preferable as the apparatus of these figures provides a continuous compensation or correction.

The apparatus in Fig. 7 is basically the same in its overall operating principle as the apparatus shown in Figs. 1 and 3. Corresponding components carry the same reference numerals. Under certain circumstances it may be desirable to provide transmitting and receiving transducers which are tuned to the respective low and high frequency bands mentioned with respect to Figs. 1 and 3. If such is the case, two transmitting transducers 215 and 216 may be provided with the transducer 215 tuned to operate in a low frequency range and the transducer 216 tuned to operate in a high frequency range. In specifying that there be ranges used, it should be remembered that it is desired that the statistically random frequencies from the transmitter 13 still be applied to the transducers 215 and 216 so as to eliminate the tendency for any standing waves to form. A pair of receiving transducers 217 and 218 are likewise provided and these may also be tuned to a frequency band corresponding to the frequency band of the associated transducer disposed on the opposite side of the pipe 10. The outputs of these transducers may be applied to an amplifying device and filtering device 16 as shown in Fig. 3 and the outputs in turn applied to an indicating instrument 18.

The overall operation of the apparatus of Fig. 7 will be the same as that of Fig. 3 with the exception that the transducers 215, 216, 217, and 218 will be tuned to accentuate the particular frequency band which it is desired to pass.

While in accordance with the provisions of the statutes, there has been illlustrated and described the best forms of the embodiments of the invention known, it will be apparent to those skilled in the art that changes may be made in the forms of the apparatus disclosed without departing from the spirit of the invention as set forth in the appended claims and that in some cases certain features of the invention may be used to advantage without a corresponding use of other features.

What I claim as new and desire to secure by Letters Patent is:

1. Apparatus for measuring a variable characteristic of a material having a mechanical vibration transmission coefficient which varies with the frequency of the mechanical vibration transmitted therethrough comprising, a multiple frequency source of power, an electro-mechanical transducer for producing vibrations in accordance with the signal applied thereto by said source of power, said transducer being arranged for transmitting a mechanical vibratory signal through the material, a mechanical-electrical transducer arranged to receive the signals from said transmitting transducer and produce an electrical output signal proportional to the magnitude of the received mechanical signal, means for amplifying the signal from said receiver transducer, a pair of filters tuned to different frequencies connected to the output of said amplifier, and signal magnitude comparing means connected to the outputs of said filters.

2. Electrical measuring apparatus comprising, a signal source having an electrical output signal comprised of statistically random frequencies, apparatus for converting the electrical output of said source to mechanical vibrations, apparatus for receiving said vibrations after said vibrations have been transmitted through a space containing a material under examination having a vibration transmission characteristic which varies as a function of the frequency of the vibrations and converting the mechanical vibrations to a proportional electrical signal, filtering means for separating the received signal into at least two different frequency components, and means for measuring the magnitude of one of the output signals of said filtering means relative to a signal level established by the other.

3. An electro-mechanical measuring apparatus for a material having a vibration transmission coefficient which varies with the frequency of the mechanical vibration transmitted therethrough comprising, a wide band frequency source, apparatus connected to said source for converting the electrical output signal of said source to mechanical vibrations, said apparatus being disposed to transmit the mechanical vibrations through the material whose character is being measured, apparatus for receiving the mechanical vibrations and converting them to a proportional electrical signal, filtering means connected to said receiving apparatus for separating the received signal into at least two separate different frequency components, and means connected to said filtering means for comparing the magnitudes of said components.

4. A paper pulp consistency measuring apparatus comprising, a single source of power having at least two signal frequencies whose magnitudes are equal, apparatus connected to said source for converting the electrical output of said source to mechanical vibrations so that these vibrations may be transmitted through a sample of paper pulp having a frequency variable vibration transmission characteristic, receiving apparatus for receiving the mechanical vibrations transmitted through the pulp and converting the vibrations to a proportional electrical signal, a pair of filters tuned to the respective signal frequencies of said source, and indicating means connected to said filters for producing an indication of the magnitude of one of the frequencies from said filters with respect to a signal level established by the other.

5. A paper pulp consistency measuring apparatus comprising, a multi-frequency source of power, a transmitting electro-mechanical transducer connected to said source and disposed to produce mechanical vibrations for transmission through a space occupied by the paper pulp whose consistency is to be measured and whose vibration transmission characteristic varies with frequency, a receiver electro-mechanical transducer having an electrical output which is proportional to the magnitude of the signals received from said transmitting transducer through the pulp, filtering means connected to said receiver transducer for separating the electrical output signal thereof into at least two different frequency components, and signal magnitude measuring means for measuring the electrical output of one of said filtering means relative to a signal level established by the other.

6. An absorption meter comprising, a wide band frequency source of energy, transmitting apparatus connected to said source for converting the electrical output of said source to mechanical vibrations, said transmitting apparatus being arranged for transmitting the mechanical vibrations through a material the vibration transmission characteristic of which is variable in accordance with the vibration frequency, receiving apparatus for receiving the mechanical vibrations transmitted through said material and converting them to a proportional electrical signal, an amplifier connected to said receiving apparatus for amplifying the received electrical signals, filtering means connected to said amplifier for separating the received signal into at least two different frequency components, and signal measuring means for measuring the signal level of one of said components relative to a signal level established by the other of said components.

7. An ultrasonic absorption meter comprising, a multi-frequency source of power, a transmitting element connected to said source of power and comprising an electro-mechanical transducer for converting the electrical signals from said source to mechanical vibrations for transmission through a space containing a material whose absorption characteristic is to be determined, said material having a frequency variable vibration transmission characteristic, a mechanical vibration receiver having an electrical output signal, said receiver being disposed in vibration signal receiving relation with respect to the material in said space, filtering means for separating the received electrical signal into at least two different frequency component parts, and indicating means connected to said filtering means for comparing the magnitudes of said components.

8. Apparatus for measuring a variable characteristic of a material by its frequency absorption spectrum comprising, a statistically random frequency signal generator having a relatively constant amplitude over a predetermined wide range of frequencies, apparatus connected to said generator for converting the electrical output of said generator to mechanical vibrations for transmission through a space where an absorption characteristic is to be determined of a material contained therein and wherein said material has a vibration transmission characteristic which is variable in accordance with the frequency of the vibration transmitted therethrough, a receiving apparatus positioned adjacent said space for receiving mechanical vibrations transmitted therethrough and converting these vibrations to a proportional electrical signal, a pair of filters tuned to different frequencies in said wide range, and signal magnitude comparing means connected to the outputs of said pair of filters.

9. Electrical measuring apparatus comprising, an ultrasonic signal generator of statistically random frequencies having a relatively constant magnitude over a predetermined range of frequencies, transmitting apparatus connected to said generator for converting the electrical output signal of said source to mechanical vibrations, said transmitting apparatus being disposed relative to an enclosure for a material having a variable frequency vibration transmission characteristic for transmitting the mechanical vibration through said enclosure, receiving apparatus for receiving the mechanical vibrations from said material and converting said vibrations to a proportional electrical signal, filtering means for separating the received signals into separate different frequency components whose magnitudes will be dependent upon the absorption characteristic of the material through which the mechanical vibrations are transmitted, signal magnitude comparing means connected to said filtering means for measuring the magnitudes of the respective components.

10. Apparatus for measuring a variable characteristic of a material having a vibrational signal transmission characteristic which varies with the frequency of vibrations transmitted therethrough comprising, a wide band frequency source having statistically random frequencies which are substantially the same in magnitude, transmitting apparatus connected to said source for converting the electrical output thereof into mechanical vibrations for transmission through an enclosure for the material under examination, a receiving apparatus for receiving the mechanical vibrations transmitted through the space and converting the vibrations to a proportional electrical signal, filtering means for separating the received signal into at least two different frequency components, and circuit means connected to said filtering means for establishing an output signal which is dependent on the characteristic changes of said material.

11. An apparatus for measuring a variable characteristic of a material having a vibrational signal transmission characteristic which varies with the frequency of the vibrations transmitted therethrough, the combination comprising, a multi-frequency source having a wide range of statistically random frequencies of substantially constant magnitude, transmitting apparatus for converting the electrical output of said source to mechanical vibrations for transmission through a space containing the material under examination, a receiving apparatus for receiving the mechanical vibrations received through said space and converting them to a proportional electrical signal, a pair of filters connected to said receiving apparatus and tuned to different frequencies one of which is high and the other of which is low, calibration shift correcting means having an input connected to the output of said low frequency filter and having an output connected to said receiving apparatus variably to adjust the amplification of said receiving apparatus in accordance with the magnitude of the input signal from said low frequency filter, and signal amplitude measuring means connected to the output of said high frequency filter.

12. An ultrasonic absorption meter for testing a material having different absorption characteristics for vibrational signals of different frequencies comprising, a wide band electrical signal source having high and low frequencies therein of substantially the same amplitude, transmitting apparatus connected to said source for converting the electrical output of said source to mechanical vibrations for transmission through a space where the material to be tested may be placed, receiving apparatus for receiving the mechanical vibrations from said space and converting said vibrations to a proportional electrical signal, a pair of filters connected to said receiving apparatus, one of said filters being tuned to a low frequency and the other being tuned to a high frequency, calibration shift correcting means connected to the output of the low frequency filter and connected to said receiving apparatus to establish a signal level substantially independent of the material, and signal measuring means connected to said high frequency filter for measuring the signal level thereof relative to a signal level established by said low frequency filter.

13. Apparatus for measuring the consistency of a paper pulp solution which solution is characterized by its ability to pass low frequency mechanical vibrations with low absorption and high frequency mechanical vibrations with high absorption, the combination comprising, a multiple frequency source of electrical signal variations having a substantially constant amplitude over a predetermined range, transmitting apparatus for converting the electrical output of said source to mechanical vibrations for transmission through a space containing a paper pulp solution, receiving apparatus for receiving the mechanical vibrations transmitted through said space and said solution and converting said vibrations into a proportional electrical signal, filtering means connected to said receiving apparatus and arranged to separate the received electrical signals into a low and a high frequency component, calibration shift correcting means connected to the output of said filtering means to respond to the low frequency component and connected to said receiving apparatus to vary the amplification thereof in accordance with the changes in signal level of the low frequency component, and signal amplitude measuring means connected to the output of said filtering means to respond to the high frequency component.

14. Apparatus as set forth in claim 13 wherein said calibration shift correcting means comprises means connected to adjust the gain of a signal amplifier which forms a part of said receiver apparatus.

15. Apparatus for measuring a variable characteristic of a material having a vibration transmission characteristic which is variable comprising, a wide band frequency source having statistically random frequencies which are substantially the same in magnitude, transmitting apparatus connected to said source for converting the electrical output thereof into mechanical vibrations for transmission through a space filled with the material under examination, a receiving apparatus including frequency separation means for receiving the mechanical vibrations transmitted through the material in the space and converting the vibrations to a proportional electrical signal and establishing two signals of different frequencies whose magnitudes vary in accordance with the characteristic of the material, and circuit means connected to said receiving apparatus for establishing an output signal which is dependent on the characteristic changes of the material in said space.

References Cited in the file of this patent

UNITED STATES PATENTS

| | | |
|---|---|---|
| 2,527,208 | Berry et al. | Oct. 24, 1950 |
| 2,612,772 | McConnell | Oct. 7, 1952 |
| 2,661,622 | Severs | Dec. 8, 1953 |

OTHER REFERENCES

Journal of Scientific Instrument, May 1951, vol. 28, No. 5, pp. 129–132 by H. R. Clayton et al.